Sept. 27, 1932. G. E. BLOOD 1,879,051
WATER MEASURING TANK FOR CONCRETE PAVERS
Filed May 17, 1930 5 Sheets-Sheet 3

Inventor:
George E. Blood,
By Parker Cook Atty.

Sept. 27, 1932.  G. E. BLOOD  1,879,051
WATER MEASURING TANK FOR CONCRETE PAVERS
Filed May 17, 1930   5 Sheets-Sheet 4

Inventor:
George E. Blood,
By Parker Cook Atty.

Sept. 27, 1932.  G. E. BLOOD  1,879,051
WATER MEASURING TANK FOR CONCRETE PAVERS
Filed May 17, 1930  5 Sheets-Sheet 5

Inventor:
George E. Blood,
By Parker Cook, Atty.

Patented Sept. 27, 1932

1,879,051

UNITED STATES PATENT OFFICE

GEORGE E. BLOOD, OF NUNDA, NEW YORK, ASSIGNOR TO THE FOOTE COMPANY, INC., OF NUNDA, NEW YORK, A CORPORATION OF DELAWARE

WATER MEASURING TANK FOR CONCRETE PAVERS

Application filed May 17, 1930. Serial No. 453,282.

My invention relates to new and useful improvements in water measuring tanks for concrete pavers, wherein a predetermined quantity of water can be delivered to the batch in the mixer drum.

As is well known to those skilled in the concrete paver art, a supply of water has to be stored so that it may be delivered to the aggregates in the mixing drum, as the same must be thoroughly mixed with water before being delivered either to the traveling bucket on the boom or to the discharge chute, when this type of delivery is used.

A further object of the invention is to provide a water measuring tank for the paver wherein the tank will be supplied from the nearest available water supply, and wherein after the tank is filled, as well as a small auxiliary tank, the supply will be automatically cut off.

Still another object of the invention is to provide a water tank wherein the amount of water the tank will hold may be accurately predetermined and easily regulated. This is desirable, as the final results of the distributed concrete is largely dependent upon the amount of water supplied to the batch while being mixed.

Still another object of the invention is to provide a water tank and a small open-topped auxiliary tank wherein after the same has filled, the supply line will be automatically cut off before the water is discharged from the tank to the mixing drum.

Still another object of the invention is to so arrange the tank and its small auxiliary tank that after the main tank has been discharged, an operation of the lever mechanism will cut off the discharge from the now empty tank and allow the tank to be again refilled, after which means operated from the auxiliary tank will again cut off the main supply to the tank.

Still another object of the invention is to provide a tank and its associated parts, so that a predetermined amount of water may be delivered to the mixing drum, regardless of the tilt or position of the paver.

Still another object of the invention is to provide a water tank which might be called an open-topped tank, as the air may readily escape from the same, there being provided but one chamber for the reception of the predetermined amount of water, from which chamber, of course, the air may escape throughout the top of the tank.

Still another object of the invention is to produce a measuring tank provided with a small auxiliary tank in which there is positioned a float valve to be operated by a backing up of the water in the auxiliary tank to thus shut off the water supply to the main tank.

Still another object of the invention is to construct a tank for concrete pavers wherein the tank above the piston is neither air nor water-tight but wherein any water that may leak by the piston may be passed or drained therefrom.

Still another object of the invention is to provide a water tank that is to be operated by the raising or lowering of the paver skip, so that as the batch is passed into the mixing drum, the predetermined amount of water will be liberated into said drum, and as the skip is again lowered, the operating mechanism connected with the tank will be again functioned, as will hereinafter be more fully described.

Still another object of the invention is to produce a measuring tank provided with an auxiliary tank and provided with certain valves, so that one may close just before the other opens, thus doing away with any by-passing of the water.

Still another object of the invention is to provide a water tank that may not only be operated by the elevating and lowering of the skip, but may be also manually operated, if so desired.

With these and other objects in view, the invention consists of certain new and novel arrangements and combination of parts, as will be hereinafter more fully described and pointed out in the claims.

Referring now to the drawings, showing a preferred embodiment of the invention.

Figure 1:
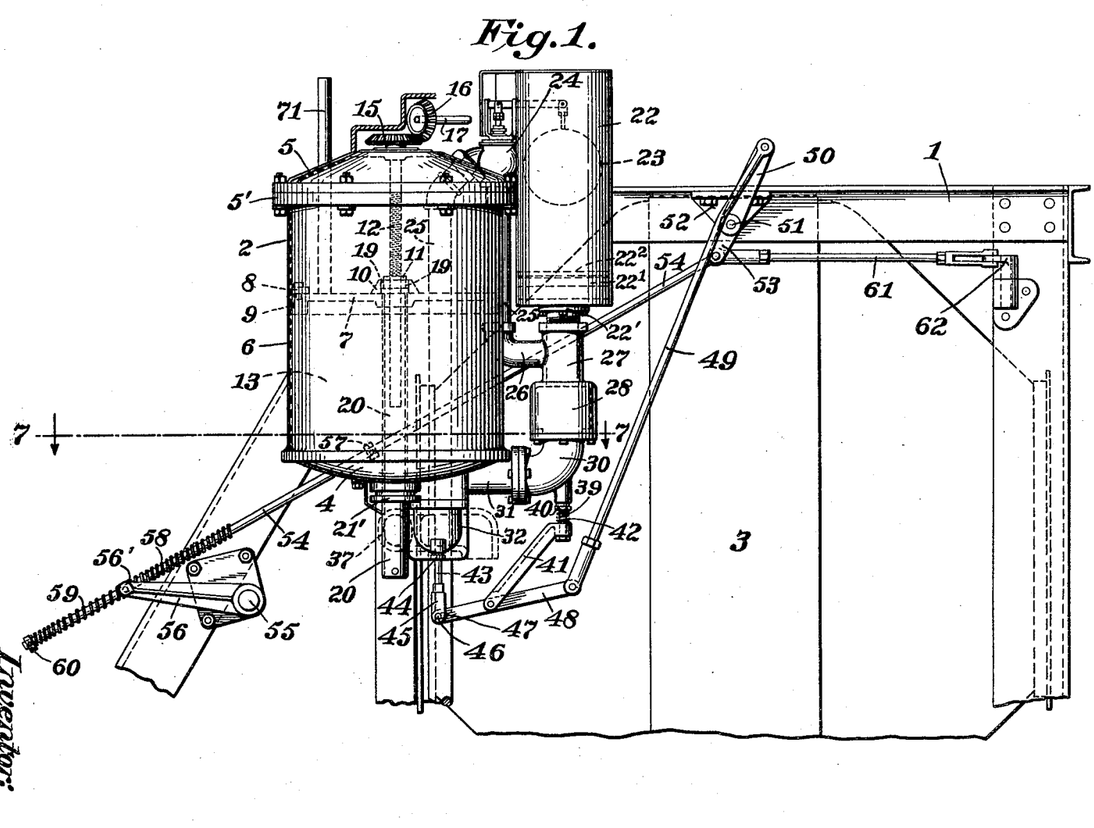
Fig. 1 is a view in elevation of my improved measuring tank for pavers showing the same as attached to the superstructure of a paver, a part being broken away to show the gearing for regulating the amount of water to be held in the tank, the dotted lines showing certain parts within the main and auxiliary tanks, and also the operating levers as they appear when the skip is in its lowered position.

Referring now more particularly to the several views, and for the moment to Fig. 1, there is shown a fragmentary superstructure 1 of a concrete paver, on which is secured the measuring tank 2 that, together with its operating means, forms the subject-matter of the present invention.

There may also be seen the mixing drum 3 which is shown partly in full lines and partly in dotted lines, so that the location of the measuring tank with regard to the mixing drum may be properly visualized.

Figure 2:
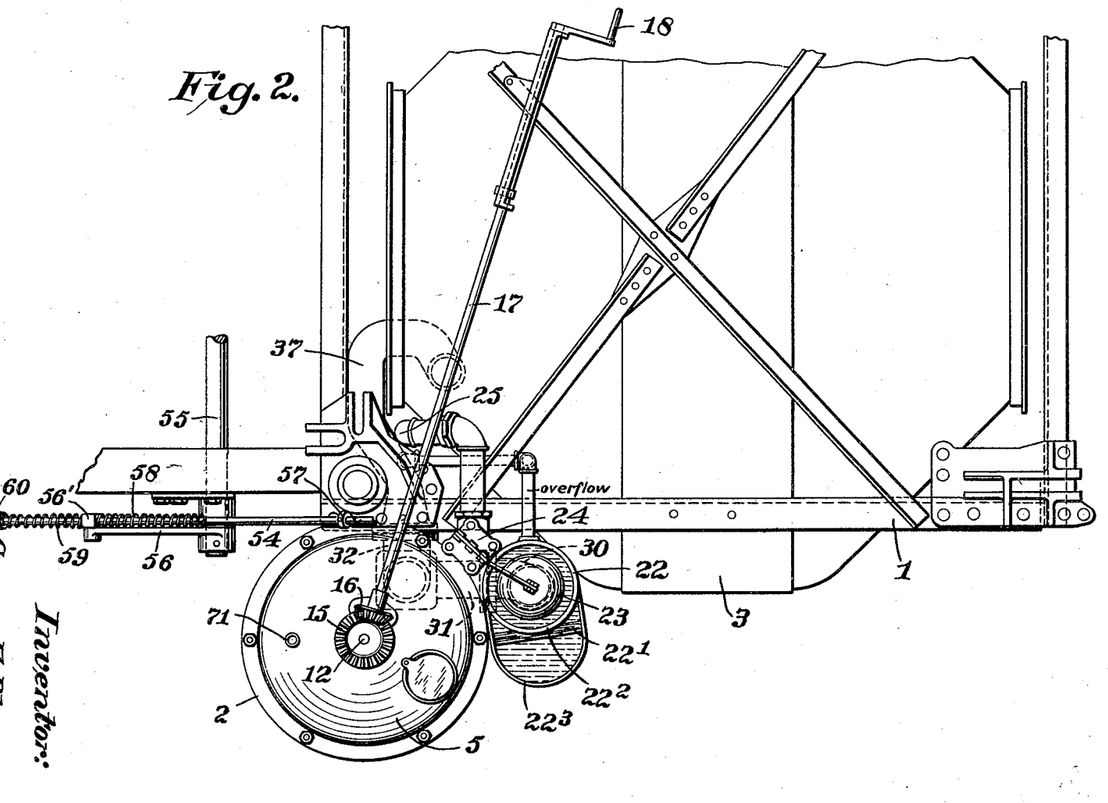
Fig. 2 is a top plan view of the same.
Figures 3, 6:
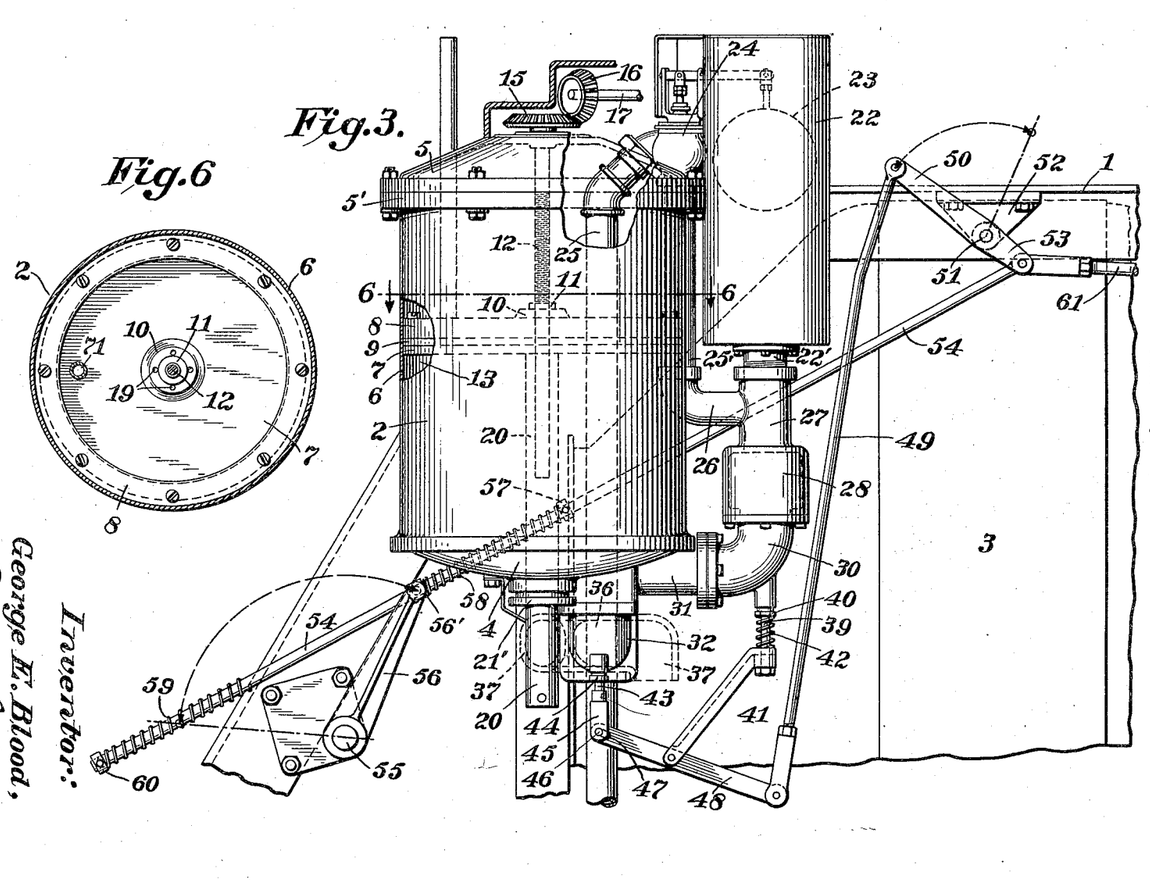
Fig. 3 is an enlarged side elevation with parts being broken away for the sake of clearness and showing how the levers appear when the skip is in its elevated position.
Fig. 6 is a sectional view taken on the line 6—6 of Fig. 3.
Figures 4, 5, 10:
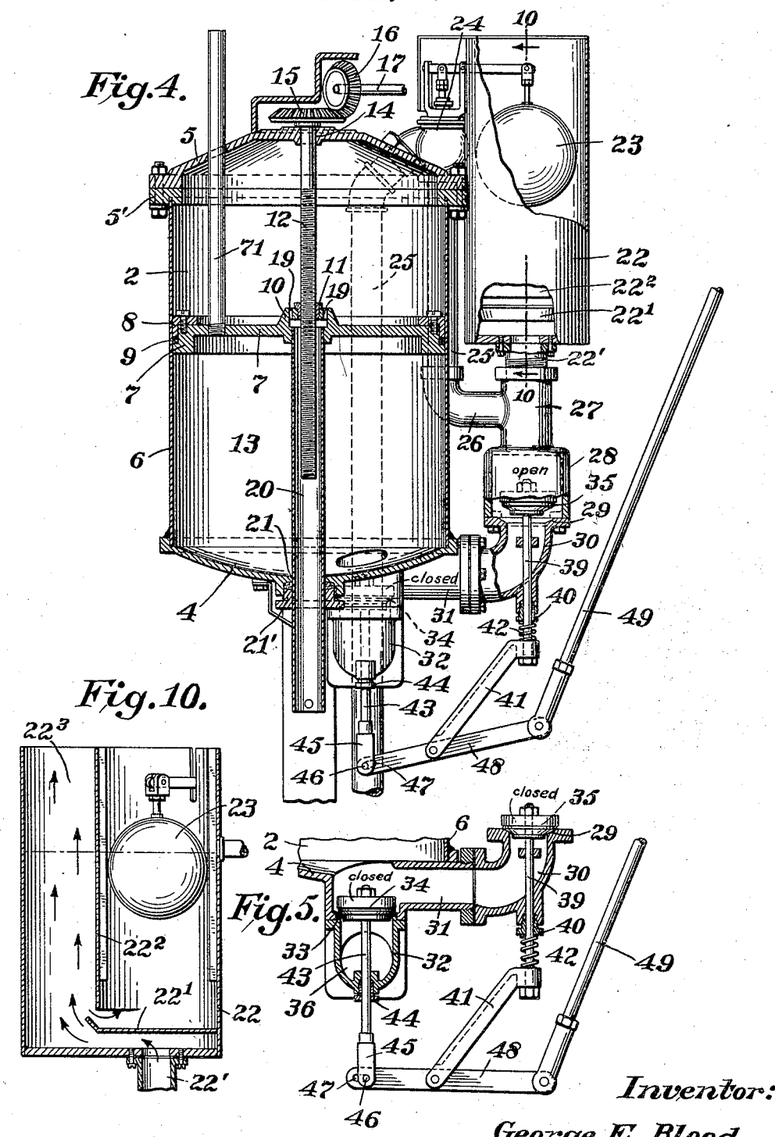
Fig. 4 is a vertical sectional view of the main tank, other parts being in elevation and parts being broken away for the sake of clearness, the valves being in their relative position when the skip is down.
Fig. 5 is a fragmentary sectional view, parts being in elevation showing the relative positions of the operating valves and parts during an intermediate position of the skip.
Fig. 10 is a vertical sectional view taken on the line 10—10 of Fig. 4.

As may also be seen in Figs. 1, 3 and 4, the measuring tank 2 comprises the bottom head 4 and the cover or top 5, while between these two parts is the cylindrical casing 6 to thus form the tank. The cover or top 5 may be bolted to the ring 5' in which the casing 6 is brazed. In the same manner, the bottom of the casing 6 may be brazed or otherwise fitted within the bottom head 4. Fitted within the tank is the adjustable piston head 7, which may have the annular ring 8 screwed thereto, this annular ring holding a packing ring 9 in position, so that the fit between the piston head and the walls of the tank will be as watertight as possible. The piston head 7 has a central hub 10 which may have the internally threaded nut 11 therein, so that the externally threaded shaft 12 passing within this nut 11 may raise or lower the piston head 7 to thus adjust the capacity of the chamber 13 of the tank. The shaft 12 will pass through an opening 14 in the center of the top 5 and will be provided with a bevel gear 15 which, in turn, meshes with a gear 16 mounted on one end of a shaft 17, while this shaft 17, in turn, will have a handle 18 at its outer end (see Fig. 2), so that by revolving the handle 18, the piston head will be raised or lowered to regulate the desired capacity of the chamber 13.

Referring to the hub 10 of the piston head, there will be seen four small passages 19, and there will also be noticed a pipe 20 which is threaded within the hub 10, this pipe 20 passing through a central opening 21 in the bottom 4 of the tank and through a stuffing box 21' and is open at its end to the atmosphere.

It will be seen, therefore, that the space above the piston head in the tank is open to atmospheric pressure, as air, of course, will pass up through the pipe 20 and through the passages 19.

It will also be noticed that threaded through the piston head 7 is a vent pipe 71, so that any air driven out of the chamber 13 by the incoming water may also pass out through this pipe 71 to the atmosphere.

The shaft 12, it will be noticed, fits within the pipe 20, but there is annular space between its outer periphery and the wall of the pipe, so that not only may air pass through the pipe 20 into the space above the piston head, but should any water leak beyond the piston head or its ring or rings rather than accumulate on top of the piston head, the water will pass out through the passages 19 and down through the pipe 20 and drop to the ground.

It will, therefore, be seen that there is really only one chamber in the tank 2, as the space above the piston head never receives any water except what might possibly leak past the piston rings and this will be allowed to discharge as it accumulates.

Also, by providing the vent pipe 71 in the piston head, it will be seen that there is never any pressure behind the piston head, so that the piston head, in turn, may be regulated without in any way having to overcome any stored-up pressure, nor will there be any pressure head to overcome, as water flows into the chamber 13.

As far as the specification has proceeded, it will be understood that the piston head 7 is first set, so that the chamber 13 will hold the desired capacity and it will, of course, be understood that this piston will not be again moved until it is desired to change the capacity of the tank.

Now referring to Figs. 1, 3 and 4, there is shown a small auxiliary tank 22 which is fastened at the outside of the main tank 2 and in which there is positioned the float 23 of a valve 24. As may be seen in dotted lines in Fig. 1, the main inlet 25 connects with this valve 24. Leading from the other side of the valve 24 is the pipe 25' that connects with the elbow 26 which, in turn, leads into the T 27, from which there extends the pipe 22' up into the bottom of the tank 22. The other branch of the T 27 extends into the small chamber 28, which chamber and its valve will be discussed more at length as the specification proceeds.

I have not gone into the specific description of the valve 24, as it may be of any desired type, but its action will be readily understood when it is stated that the ball float 23 raised by water filling the tank 22 will close the valve, so that the water from the main inlet 25 will be cut off until the float again drops.

To protect the ball or float from the water rushing into the auxiliary tank 22, especially if there is any air in the supply line, or where a pump is used for supplying water under pressure to the main supply line, I provide a small baffle plate $22^1$ in the bottom of this tank and also put in a small vertical partition wall $22^2$ at one side thereof, this vertical wall terminating short of the baffle plate to thus leave a restricted passageway between the lower edge of this wall $22^2$ and the edge of the baffle plate $22^1$.

Thus, one the inrush of the water, and possibly air, the water and air will be diverted from directly striking the ball 23 and injuring the same or injuring the valve 24, and will pass upwardly through what might be termed an air relief chamber $22^3$. The water, of course, will also, more slowly, pass between the baffle plate and the lower edge of the vertical wall and will rise to the same levels in both the relief chamber and the main chamber of the tank.

Figure 7:
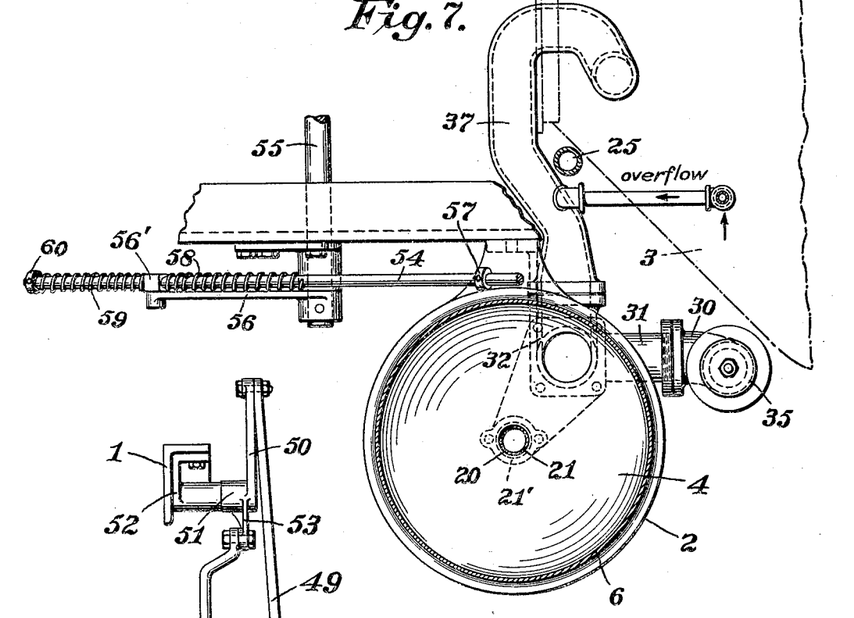
Fig. 7 is a sectional view taken on the line 7—7 of Fig. 1.

There is also provided a small overflow pipe (see Figs. 2 and 7) from the top of the auxiliary tank that leads down to the pipe 37 to thus take care of any accidental overflooding of the auxiliary tank.

Figures 8, 9:
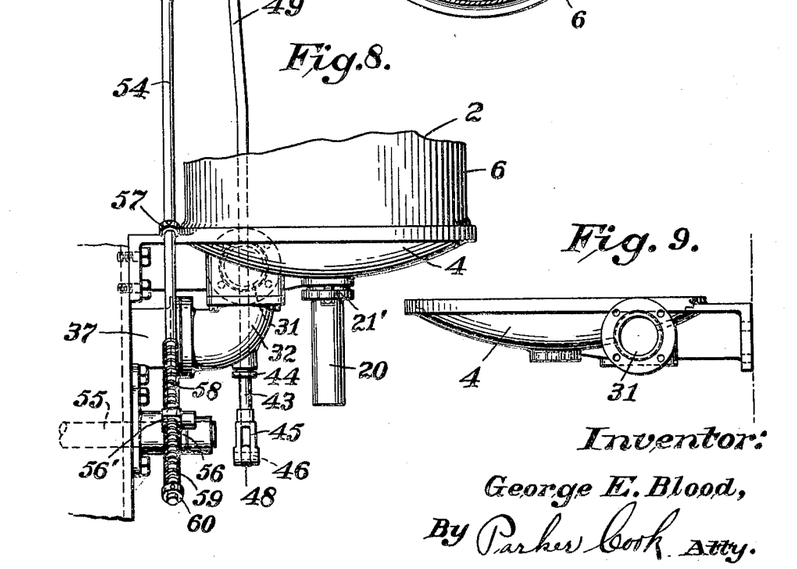
Fig. 8 is a fragmentary elevation of a portion of the tank and the operating levers that are connected to the skip shaft, taken at right angles to Fig. 1 and viewed from the left thereof.
Fig. 9 is a fragmentary side elevation of the lower head of the tank, as viewed from the opposite side of Fig. 8.

Continuing the description of the chamber 28 and its mechanism, attention might be called to Fig. 5 where it will be noticed that this chamber 28 has a valve seat 29 at its bottom. This bottom may be formed as part of an elbow 30 which, in turn, is connected to the pipe 31 that extends into the bottom 4 of the tank, as may be seen in Figs. 7, 8 and 9.

Also connected with the pipe 31 is the small casting 32 provided with a valve seat 33, there being the poppet valve 34 operating on this seat, while a valve 35 operates in the heretofore mentioned chamber 28 and opens and closes on the valve seat 29. The casting 32, it will be seen, has the main discharge opening 36 therein, to which is connected the pipe 37, which allows the water to pass into the mixing drum when the valves are operated, as will be shortly described.

Referring for the moment to the valve 35 fitting within the chamber 28, it will be seen that it is provided with a regular valve stem 39 that passes out through the ordinary stuffing box 40 and is connected at its lower end to a small arm 41, there being a small spring 42 between the stuffing box and said arm. Likewise, there is a valve stem 43 connected with the poppet valve head 34, which stem passes out through the stuffing box 44 and has the bifurcated end 45, which end, in turn, is pinned, as at 46, within the slot 47 to a connecting link 48.

The small arm 41 is also pivoted to this link 48, as may be seen in Figs. 4 and 5, while to the outer end of the link 48 is connected the rod 49 that runs upwardly and is connected at its upper end to the short crank 50 pivotally mounted at 51 to the bracket 52 on the superstructure 1 of the paver.

*Automatic operating mechanism for tank*

Before describing how the tank is filled and discharged, the automatic mechanism for controlling the operations will be described.

To the end 53 of the crank arm 50, there is connected the long rod 54 that runs past the tank and down past the skip shaft 55.

I have not shown the skip in the drawings, but it will be understood that it is connected at its ends to the rock shaft 55, while also located on this shaft 55 is the crank arm 56, so that as the skip shaft 55 revolves with the raising and lowering of the skip (not shown), likewise the arm 56 will move through the dotted line arc shown in Fig. 3.

On the rod 54, there will be noticed an adjustable collar 57 and a small spring 58 which will bear against the swivel block 56' and the collar 57. Likewise, there will be seen another small spring 59 at the lower end of the rod 54 which bears against the fixed collar 60 set at the end of the rod.

As the skip shaft 55 revolves on the raising of the skip (not shown) from the position shown in Fig. 1, the lever arm 56 also rocks and the small swivel block 56' slides along the rod 54 which, of course, swings upwardly and inwardly, but does not swing inwardly to open the discharge valve 34 until the spring 58 is tightly compressed against the collar 57 heretofore mentioned which, latter is adjustable on the rod 54 to thus time the opening of this discharge valve 34. In other words, as the rod 54 is forced upwardly, the lever 50 swings downwardly to in turn push down the rod 49. The lowering of this rod 49 pulls downwardly first on the short arm 41, thus closing the valve 35, while the continued downward movement of the rod 49, now fulcrumed at the end of the link 41, will cause the other end of the link 48 to move upwardly, as shown in Fig. 3, and thus cause the discharge valve 34 to be moved upwardly to open position. In the same way, when the skip is lowered, the rocking of the shaft 55 to the position shown in Fig. 1 of the drawings does not operate the valves until it compresses the lower spring 59 which, of course, is also adjustable by changing the position of the collar 60 at the bottom end of the rod.

Before mentioning the operation of the tank, it might be stated, as seen in Fig. 1, that there is also a means of manually operating these valves, which consists in providing the rod 61, which is connected at its one end to the lower end 53 of the small crank arm 50 heretofore mentioned, and this rod 61 is connected to one arm of a bell crank 62 which, in turn, may be connected to a handle (not shown) for operating the valves to discharge the tank independently of the movement of the skip.

*Operation of the tank*

Assuming that the piston head 7 has been set to regulate the capacity by a movement of the handle 18 and its connections, the water from the main supply will enter the pipe 25 and pass up through the valve 24 and then down through the pipe 25' into the elbow 26, T 27, and downwardly into the chamber 28, and as this valve 35 is now open, the skip being in its lowered position or the valves in the position as shown in Fig. 4, the water will flow past the valve 35 and through the pipe 31, and the lower valve 34 being closed, the water will fill up the chamber 13 and even rise in the pipe 71 to the level of the valve 24. After the chamber 13 is filled, the water will back up into the auxiliary tank 22 to thereby raise the float 23 and cut off the valve 24 in the main supply pipe 25. On a raising of the skip and a rocking of the shaft 55 and its crank arm 56, the small spring 58 will be slowly compressed and finally after the same has been compressed, the rod 54 will swing the small crank arm 50, thus forcing the rod 49 downwardly to in turn pull the valve 35 downwardly and close the same, and after this is closed, will force the small discharge valve 34 upwardly to open the same. The predetermined amount of water will now pass from the chamber 13 out through the discharge pipe 37 and into the mixing drum.

When the skip (not shown) is lowered, the crank arm 56, through a rocking of the skip shaft 55, will swing downwardly from the position shown in Fig. 3 to the position shown in Fig. 1 and after this lower spring has been compressed, the rod 49 and the crank arm 50 will assume the position shown in Fig. 1, thus first closing the discharge valve 34 and momentarily thereafter opening the valve 35. This allows the water to drain from the auxiliary tank down into the chamber 13 and in so doing allows the ball 23 to drop and thereby opens the main inlet valve 24, so that the water may again pass into the chamber 13 and again back up into the auxiliary tank until the ball valve rises and closes the inlet valve.

It will thus be seen that by arranging the two springs 58 and 59 with the adjustable collars as shown, the operation of the valves may be properly timed, so that the filling and refilling of the tank is quickly and accurately accomplished. It will also be seen that by arranging the valve system in this way, there are no intricate by-passes, but, on the other hand, the valves are accurately timed for performing the desired functions.

I have shown the poppet type of valves which, of course, may have the rubber seats, so that the valves may be kept tight at all times and in case of wear, they may be quickly provided with new rubber washers. Of course, should it be desired to water the batch or to operate the tank manually, it is only necessary to manipulate the rod 61 to thus work the several connecting rods heretofore described to actuate the several valves.

From the foregoing, it will be seen that I have provided a water measuring tank for concrete pavers consisting of but few parts, that is, primarily an adjustable piston head to regulate the capacity and a small auxiliary tank provided with a float valve which is connected to the main supply line, together with the provision of two properly timed valves that are either automatically operated by the raising and lowering of the skip or that may be manually operated, if desired. Furthermore, the valves may be properly timed by the setting of the adjustable collars, and it will be understood that one valve will be closed just slightly before the other valve is opened or, in other words, there will be a short interval of time when the skip is passing through a part of its raising and lowering movement that both valves will be momentarily closed. By having the valves and their mechanism arranged in this manner, all by-passing of the water and its disadvantages are overcome.

It will further be seen that the entire arrangement is a very simple one and easily assembled and easily repaired and has proved very accurate and highly efficient in service.

It will also be seen that there is no air pressure in the tank and the accuracy is not affected by either water pressure, condition of grade, or air in the supply line, and that the main tank or chamber supply is controlled by a float valve operated by the rise and fall of water in an auxiliary tank. It will also be understood that the operating valves are relieved from that constant wear which naturally results in a tank which operates under pressure.

Many slight changes might be made without in any way departing from the spirit and scope of the invention.

Having thus described my invention, what I claim as new and desire to secure by Letters Patent is:

1. A water measuring tank having a piston therein, means for adjusting and setting the piston to predetermine the capacity of the tank, an auxiliary tank without said measuring tank, a conduit between the auxiliary tank and the measuring tank, a main liquid supply pipe leading to said conduit between the tanks, a main inlet valve operated by the water rising in said auxiliary tank, a valve in the conduit between the auxiliary and the measuring tanks and a discharge valve in the measuring tank and operably connected with the just forementioned valve, and means for alternately operating both of said last mentioned valves in timed relation with each other.

2. A water measuring tank having a piston head therein and means for adjusting the piston head to predetermine the capacity of the tank, an auxiliary tank, a pipe forming a passageway between the auxiliary tank and the bottom of the measuring tank, a valve in said passageway, a main liquid supply pipe extending to said passageway, a float valve connected with the main liquid supply pipe and closed by the water backing up in the auxiliary tank, a discharge valve in the measuring tank connected with the valve in the passageway, and means for operating said two last mentioned valves whereby the discharge valve will be opened directly after the valve in the passageway is closed.

3. A water measuring tank and means for predetermining the capacity thereof, an auxiliary tank associated therewith, a pipe forming a passageway between the bottom of the auxiliary tank and the bottom of the measuring tank, a main liquid supply pipe connected to said passageway, a discharge valve in the measuring tank and a valve in the aforementioned passageway and below the connection between the measuring supply pipe and the inlet to the bottom of the auxiliary tank, a float operated valve interposed in the main liquid supply pipe and operated by the change of level of the water in the auxiliary tank, and means connected to the valve in the passageway and the discharge valve for operating these valves whereby one is closed before the other opens.

4. A measuring tank for concrete pavers, means for adjusting the capacity of the tank, an auxiliary tank connected with the measuring tank, a main liquid supply pipe, means operable from the auxiliary tank for cutting off the main liquid supply pipe, means for cutting off the auxiliary tank from the measuring tank cooperatively connected with means for discharging the measuring tank directly after the auxiliary tank is cut off from the measuring tank.

5. A water measuring tank for concrete pavers, adjustable means for regulating the capacity of the tank, an auxiliary tank connected with the measuring tank, a main liquid supply pipe, means operable from the auxiliary tank for cutting off the main liquid supply pipe after the measuring tank has been filled, means for shutting off the auxiliary tank from the measuring tank, a rockable shaft for controlling the means for shutting off the auxiliary tank from the measuring tank, and cooperating means for discharging the measuring tank directly after the auxiliary tank is cut off from the measuring tank by a rocking of said shaft.

6. A water measuring tank for concrete pavers, adjustable means for regulating the capacity of the tank, an auxiliary tank connected with the measuring tank, a main liquid supply pipe, means operable from the auxiliary tank for cutting off the main liquid supply pipe after the measuring tank has been filled, a valve for shutting off the auxiliary tank from the measuring tank, a rockable shaft for actuating the last-mentioned valve, a valve for discharging the measuring tank and connected to the aforementioned valve, and said valve discharging the measuring tank directly after the auxiliary tank is cut off from the measuring tank by a rocking of said shaft.

7. A water measuring tank for concrete pavers having an adjustable piston head therein and means for adjusting the same, a vent pipe extending from the piston head upwardly and through the upper wall of the measuring tank so that the chamber below the piston head is open to atmospheric pressure, a pipe forming a passageway from above the piston head down through the chamber below the piston head and extending without the tank to form a discharge for any leakage around the piston head.

8. A water measuring device for concrete pavers comprising a main tank, a piston head therein and means for setting the piston head to predetermine the capacity of the tank, a water supply line for the device, an auxiliary tank, float means associated with the auxiliary tank for controlling the flow of water into the main tank, valve means for discharging the main tank and for cutting off the auxiliary tank from the main tank, and means in the auxiliary tank for protecting the controlling means from a sudden rush of water and air into the auxiliary tank.

9. A water measuring tank for concrete pavers, an auxiliary tank, valve means cooperating with the auxiliary tank for automatically controlling the flow of water into and out of the main tank, a rod connected with said valve means, a rock shaft for operating said rod and adjustable means on said rod for timing said valve means after the initial movement of said rod and a further valve for controlling the flow of water to the first-mentioned valve means.

10. A water measuring tank for concrete pavers, valve means for controlling the inflow and outflow of water from the tank, a rod connected to said valve means, a rock shaft connected to said rod, springs and adjustable collars on said rod for timing the movement of said valve means on the operation of said rock shaft and the movement of said rod and a further valve for controlling the flow of water to the first-mentioned valve means.

11. A water measuring tank for concrete pavers comprising a main tank and an auxiliary tank and valve mechanism for supplying and cutting off the water to said main tank, valve mechanism for discharging the main tank, a rod connected to said last-mentioned valve mechanism, a rockable shaft connected to said rod, and the connection between the rod and the rockable shaft being such that the timing of the movement of said valves may be predetermined and a further valve for controlling the flow of water to the first-mentioned valve mechanism.

12. A water measuring tank for concrete pavers, an adjustable piston head for regulating the capacity of the tank, an auxiliary tank without the measuring tank, a pipe connection between the auxiliary tank and the main tank, a main supply pipe leading to the said aforementioned pipe, a float-operated valve within the main supply pipe and the float operable from the auxiliary tank for cutting off the valve after the measuring tank has been filled, a discharge valve for the measuring tank, another valve in the pipe that extends between the auxiliary and measuring tanks and located below the point where the main supply pipe connects with the said last-mentioned pipe, the said two last-mentioned valves being interconnected and arranged to operate one directly after the other, and automatic means for operating said two last-mentioned valves to thereby discharge the said measuring tank.

13. A water measuring tank for concrete pavers, an auxiliary tank piped thereto, a main liquid supply pipe leading to the above-mentioned pipe, a valve within the pipe extending between the measuring and auxiliary tanks for cutting off the auxiliary tank from the measuring tank, and a further valve at the bottom of the measuring tank for discharging the same, the two valves being interconnected and set so that the one closes before the other opens, a ball float-operated valve in the main liquid supply pipe and the ball positioned within the auxiliary tank for cutting off the supply of liquid when the measuring tank is filled, automatic means for operating the two aforementioned interconnected valves whereby the measuring tank may be discharged and whereby the measuring tank may be allowed to fill when the automatic means is reset.

14. A water measuring tank for concrete pavers, an auxiliary tank, a pipe interconnecting the two said tanks, a main liquid supply pipe connected to the interconnecting pipe, a valve within said interconnecting pipe, a ball float-operated valve within the main liquid supply pipe and having its ball within the auxiliary tank and operated by the liquid rising and lowering in the said auxiliary tank to regulate the flow in the main liquid supply pipe, a discharge valve in the measuring tank and interconnected with the valve in the interconnecting pipe, and means for timing the said valves so that one of said valves is closed just before the other of said valves is open, automatic means for operating the last-mentioned valves whereby the auxiliary tank will be cut off from the measuring tank before the measuring tank is discharged and whereby one of said valves, that is, the discharge valve, is closed before the valve in the interconnecting pipe is open.

15. A water measuring tank for concrete pavers and means for predetermining the capacity thereof, an auxiliary tank and a pipe extending between the auxiliary tank and the measuring tank, a main liquid supply pipe, a ball float-operated valve within the main liquid supply pipe and having its ball positioned within the auxiliary tank whereby the valve is cut off after the measuring and auxiliary tanks are filled, a discharge valve in the measuring tank, a further valve between the auxiliary and measuring tanks, and the said two last-mentioned valves interconnected, means for operating the said interconnected valves whereby the auxiliary tank is cut off from the measuring tank on an emptying of the measuring tank and whereby when one of said last-mentioned valves, that is, the discharge valve, is closed, the ball float-operated valve in the main liquid supply pipe will automatically stay open until the measuring and auxiliary tanks are again refilled.

16. A water measuring tank for concrete pavers, a piston head therein and means for setting the piston head to predetermine the capacity of the tank, a vent pipe extending from said piston up through the top of the tank, an open-topped auxiliary tank, a pipe interconnecting the bottom of the auxiliary tank and the bottom of the measuring tank, a main liquid supply pipe extending to said interconnecting pipe, a float-operated valve in the said main liquid supply pipe having its float positioned within said auxiliary tank for opening and closing the valve in the main supply pipe, a discharge valve in the measuring tank, a further valve in said interconnecting pipe below the point where the main liquid supply pipe joins the said interconnecting pipe, the two last-mentioned valves interconnected, the connection so arranged that the one valve opens slightly after the other one closes, automatic means for operating the last-mentioned valves to cause the measuring tank to discharge and allowing the valve in the main supply tank to automatically remain open until cut off by the water backing up in the auxiliary tank.

17. A water measuring tank for concrete pavers having an adjustable piston head to regulate the capacity of the tank, a vent pipe extending from the piston head up and out through the top of the tank, an open-topped auxiliary tank the upper end of which is below the top of the vent pipe, an interconnecting pipe between the auxiliary tank and the measuring tank, a main liquid supply pipe connected to the interconnecting pipe, a float valve regulating the flow in the said main liquid supply pipe and operated by the rise and fall of the water in the auxiliary tank, a discharge valve for the measuring tank, a valve for cutting off the auxiliary tank from the measuring tank and the two last mentioned valves interconnected, timing means whereby one of the interconnected valves closes slightly before the other opens, and automatic means for operating these last-mentioned valves.

18. A water measuring tank for concrete pavers having an adjustable piston, an auxiliary tank, a supply pipe for the auxiliary tank, a float-operated valve in the supply pipe, the float being located in the auxiliary tank and operated by the change in level of the water in the auxiliary tank, a pipe line between the auxiliary tank and the measuring tank, a valve for regulating the discharge of the measuring tank and a valve for cutting off the auxiliary tank from the measuring tank, a shiftable link connection between the two last-mentioned valves and a rod connected to the said link connection, whereby a downward movement of said rod will close one of said last-mentioned valves slightly before the opening of the other of said valves.

19. A water measuring tank for concrete pavers having an adjustable piston, an auxiliary tank, a supply pipe for the auxiliary tank, a float-operated valve in the supply pipe, the float being located in the auxiliary tank and operated by the change in level of the water in the auxiliary tank, a pipe line between the auxiliary tank and the measuring tank, a valve for regulating the discharge of the measuring tank and a valve for cutting off the auxiliary tank from the measuring tank, a shiftable link connection between the two last-mentioned valves, a rod connected to the said link connection, whereby a downward movement of said rod will close one of said last-mentioned valves slightly before the opening of the other of said valves, means adapted to be connected to a rockable shaft for operating said rod, and timing means on said rod to actuate said last-mentioned valves after a certain amount of movement of said rod.

In testimony whereof I affix my signature.

GEORGE E. BLOOD.